(12) United States Patent
Tertinek et al.

(10) Patent No.: US 11,428,772 B2
(45) Date of Patent: Aug. 30, 2022

(54) COMPENSATING FOR CROSSTALK IN DETERMINATION OF AN ANGLE OF ARRIVAL OF AN ELECTROMAGNETIC WAVE AT A RECEIVE ANTENNA

(71) Applicant: NXP B.V., Eindhoven (NL)

(72) Inventors: Stefan Tertinek, Graz (AT); Michael Schober, Graz (AT); Dominik Doedlinger, Graz (AT)

(73) Assignee: NXP B.V., Eindhoven (NL)

( * ) Notice: Subject to any disclaimer, the term of this patent is extended or adjusted under 35 U.S.C. 154(b) by 121 days.

(21) Appl. No.: 16/882,955

(22) Filed: May 26, 2020

(65) Prior Publication Data
US 2021/0373112 A1 Dec. 2, 2021

(51) Int. Cl.
| | |
|---|---|
| *G01S 3/10* | (2006.01) |
| *G01S 3/48* | (2006.01) |
| *G01S 3/46* | (2006.01) |
| *G01S 3/00* | (2006.01) |

(52) U.S. Cl.
CPC .......... *G01S 3/10* (2013.01); *G01S 3/48* (2013.01); *G01S 3/00* (2013.01); *G01S 3/46* (2013.01)

(58) Field of Classification Search
CPC ..... G01S 3/10; G01S 3/46; G01S 3/48; G01S 3/00
USPC .................................................. 342/420, 442
See application file for complete search history.

(56) References Cited

U.S. PATENT DOCUMENTS

| | | | | |
|---|---|---|---|---|
| 4,845,502 A | * | 7/1989 | Carr .......................... | G01S 3/46 342/430 |
| 5,285,209 A | * | 2/1994 | Sharpin ................... | G01S 7/021 342/13 |
| 5,477,230 A | * | 12/1995 | Tsui ......................... | G01S 7/021 342/442 |
| 5,572,220 A | * | 11/1996 | Cai .......................... | G01S 3/043 342/424 |
| 6,459,903 B1 | * | 10/2002 | Lee .......................... | G01S 5/12 455/456.1 |
| 7,286,085 B2 | * | 10/2007 | Kolanek .................. | G01S 3/46 342/442 |
| 7,292,180 B2 | * | 11/2007 | Schober .................. | G01S 11/04 342/36 |
| 7,498,976 B2 | * | 3/2009 | Schober .................... | G01S 3/48 342/146 |
| 10,075,210 B2 | | 9/2018 | Marrow et al. | |
| 10,416,269 B2 | * | 9/2019 | Robinson ................. | G01S 3/46 |

(Continued)

FOREIGN PATENT DOCUMENTS

WO    WO-2015176776 A1 * 11/2015 ............. G01S 3/023

OTHER PUBLICATIONS

Dotlic et al., "Angle of Arrival Estimation Using Decawave DW1000 Integrated Circuits," 14th Workshop on Positioning, Navigation and Communication, Oct. 25-26, 2017, 6 pages.

*Primary Examiner* — Chuong P Nguyen (57) ABSTRACT

An angle of arrival (AoA) of an electromagnetic wave is determined. A phase of an antenna signal associated with each of two receive antenna is measured. A measured phase difference of arrival (PDoA) of the electromagnetic wave is determined based on the measured phase of each of the antenna signals. The measured PDoA is corrected based on one or more crosstalk factors associated with the two receive antennas. The AoA of the electromagnetic wave at the two receive antenna is generated based on the corrected measured PDoA.

17 Claims, 8 Drawing Sheets

(56) References Cited

U.S. PATENT DOCUMENTS

| | | | |
|---|---|---|---|
| 10,481,236 B2* | 11/2019 | Simileysky | H04W 4/023 |
| 10,539,645 B2* | 1/2020 | Bialer | G01S 3/50 |
| 10,890,644 B1* | 1/2021 | Berger | G01S 7/40 |
| 2006/0114157 A1* | 6/2006 | Kolanek | G01S 3/46 |
| | | | 342/424 |
| 2014/0269389 A1* | 9/2014 | Bukkfejes | G01S 3/48 |
| | | | 370/252 |
| 2015/0192656 A1* | 7/2015 | Werner | G01S 3/46 |
| | | | 342/352 |
| 2019/0331783 A1* | 10/2019 | McLaughlin | G01S 3/48 |
| 2021/0396832 A1* | 12/2021 | McLaughlin | H04B 7/086 |

\* cited by examiner

COMPENSATING FOR CROSSTALK IN DETERMINATION OF AN ANGLE OF ARRIVAL OF AN ELECTROMAGNETIC WAVE AT A RECEIVE ANTENNA

FIELD OF USE

This disclosure generally relates to communication systems, and more particularly to compensating for crosstalk in determination of an angle of arrival of an electromagnetic wave at a receive antenna.

BACKGROUND

A positioning system such as an ultra-wideband (UWB) positioning system determines a position of a transmitter based on a time of flight of an electromagnetic wave transmitted between the transmitter and a receiver and an angle of arrival (AoA) of the electromagnetic wave at a receive antenna. A phase difference of arrival (PDoA) of the electromagnetic wave at two receive antennas is indicative of the AoA. The PDoA takes into account the fact that the electromagnetic wave arriving at one receive antenna is phase-shifted with respect to arrival at another receive antenna due to physical separation of the two receive antennas. Accurate AoA for purposes of determining the position of the transmitter relies on determining an accurate PDoA.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows for determining an angle of arrival (AoA) of an electromagnetic wave at a receive antenna. The AoA is an angle of the electromagnetic wave incident on the receive antenna. In examples, the AoA is determined by measuring a phase difference of arrival (PDoA) of the electromagnetic wave at two receive antennas and correcting the measured PDoA for crosstalk. In examples, crosstalk takes the form of interference between the receive antennas and/or between connections such as printed circuit board (PCB) traces from the receive antennas to a receiver. The example systems, methods, techniques, and program flows as described herein are used in a positioning system to determine a distance from a transmitter to the receiver, among other types of systems where accurate AoA is needed. Well known instructions, protocols, structures, and techniques have not been shown in detail in order not to obfuscate the description.

Example System

Figure 1:
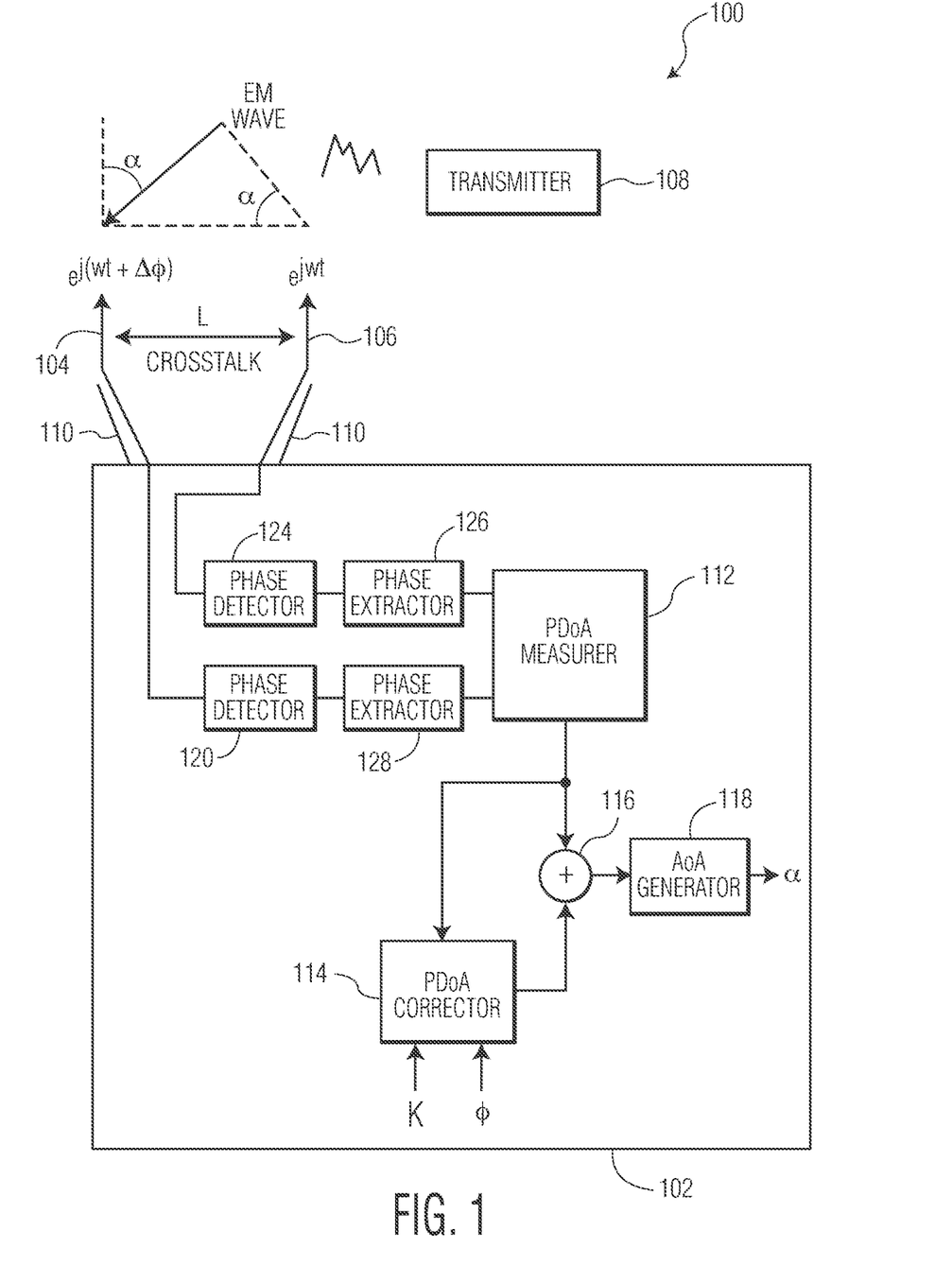
FIG. 1 is an example block diagram for determining an angle of arrival (AoA) of an electromagnetic wave at a receive antenna.

FIG. 1 is an example block diagram 100 for determining an angle of arrival (AoA) represented as a of an electromagnetic wave (EM) at a receive antenna. A transmitter 108 which is separated from a receiver 102 by an air interface may be arranged to transmit the electromagnetic wave and two or more receive antenna 104, 106 may be arranged to receive the electromagnetic wave over the air interface. In some examples, the transmitter 108 may have a receiver (not shown) in which case the transmitter 108 and receiver (not shown) defines a transceiver. Also, in some examples, the receiver 102 may have a transmitter (not shown) in which case the receiver 102 and transmitter (not shown) defines another transceiver.

In examples, the electromagnetic wave transmitted by the transmitter 108 to the receiver 102 may take the form of one or more carrier waves which modulate a sequence of one or more pulses to form radio frequency (RF) pulses. Each pulse of the pulse sequence may be an increasing amplitude followed by decreasing amplitude in time or a decreasing amplitude followed by an increasing amplitude in time. The pulse sequence may represent one or more symbols in a preamble of a frame defined by the Institute of Electrical and Electronics Engineers (IEEE) 802.15.4. The preamble may include one or more symbols and each symbol may be defined by one or more ternary codes. In examples, the preamble of the frame may define up to 512 symbols and the pulse sequence may represent one or more symbols in the preamble of the frame.

In an example, the receiver 102 may be coupled to two receive antenna 104, 106 arranged to receive the electromagnetic wave from the transmitter 108. In other examples, the receiver 102 may be coupled to additional receive antenna. A wavelength λ of the electromagnetic wave may depend on a type of communication associated with the electromagnetic wave such as a Bluetooth signal at 2.4 GHz, a WiFi signal at 5 GHz, or an ultra wide band (UWB) signal between 3.1 GHz to 10.6 GHz. The electromagnetic wave received at each receive antenna may be given by:

$$a_1(t) = e^{j\Delta\phi} e^{j\omega t} \quad (1)$$

$$a_2(t) = e^{j\omega t} \quad (2)$$

where $a_1(t)$ is an antenna signal resulting from the electromagnetic wave received at receive antenna 104, $a_2(t)$ is an antenna signal resulting from the electromagnetic wave received at receive antenna 106, and ω is a frequency of the electromagnetic wave. The antenna signal of the receive antenna 104 and the antenna signal of the receive antenna 106 may differ by a phase difference Δϕ also known as a phase difference of arrival (PDoA) associated with the electromagnetic wave. The PDoA may indicate a difference in phase when the electromagnetic wave first arrives at each antenna. The PDoA takes into account the fact that the electromagnetic wave arriving at one receive antenna 104 is phase-shifted with respect to the other receive antenna 106 because the two receive antennas 104, 106 are physically separated by a distance L.

The AoA is then given by:

$$AoA = \alpha = \arcsin\left(\frac{PDoA \lambda}{2\pi L}\right) \quad (3)$$

In this regard, the receiver 102 which is coupled to the two receive antenna 104, 106 is arranged to determine the PDoA and then based on the PDoA determine the AoA of the electromagnetic wave at a receive antenna.

The receiver 102 may include one or more components such as a phase detector 120, a phase detector 124, a phase extractor 126, a phase extractor 128, a PDoA measurer 112, a PDoA corrector 114, a combiner 116, and an AoA generator 118. The phase detector 120 and the phase detector 124 may be implemented using circuitry such as analog circuitry, mix signal circuitry, memory circuitry, logic circuitry, and/or processing circuitry arranged to execute code stored in a memory and when executed by the processing circuitry perform the disclosed functions of the phase detector. The phase extractor 126 and the phase extractor 128 may be implemented using circuitry such as analog circuitry, mix signal circuitry, memory circuitry, logic circuitry, and/or processing circuitry arranged to execute code stored in a memory and when executed by the processing circuitry perform the disclosed functions of the phase extractor. The PDoA measurer 112 may be implemented using circuitry such as analog circuitry, mix signal circuitry, memory circuitry, logic circuitry, and/or processing circuitry arranged to execute code stored in a memory and when executed by the processing circuitry perform the disclosed functions of the PDoA measurer 112. The PDoA corrector 114 may be implemented using circuitry such as analog circuitry, mix signal circuitry, memory circuitry, logic circuitry, and/or processing circuitry arranged to execute code stored in a memory and when executed by the processing circuitry perform the disclosed functions of the PDoA corrector 114. The combiner 116 may be implemented using circuitry such as analog circuitry, mix signal circuitry, memory circuitry, logic circuitry, and/or processing circuitry arranged to execute code stored in a memory and when executed by the processing circuitry perform the disclosed functions of the combiner 116. The AoA generator 118 may be implemented using circuitry such as analog circuitry, mix signal circuitry, memory circuitry, logic circuitry, and/or processing circuitry arranged to execute code stored in a memory and when executed by the processing circuitry perform the disclosed functions of the AoA generator 118. In some embodiments, some of the components may be implemented with same circuitry such as same processing circuitry executing different sets of code. The components may be implemented in other ways as well.

In examples, the two receive antennas 104, 106 may be arranged as chip antennas on a printed circuit board (PCB) to receive the electromagnetic wave. The antenna signals of each receive antenna 104, 106 may be provided to the receiver 102 via a connection such as PCB traces 110 and to a respective phase detector 120, 124. For example, the antenna signal of receive antenna 104 may be provided to phase detector 120 and the antenna signal of receive antenna 106 may be provided to phase detector 124. The phase detector 120 may be arranged determine a phase of the antenna signal as a function of time associated with the receive antenna 104 which is output as a phase signal. Similarly, the phase detector 124 may be arranged to determine a phase of the antenna signal as a function of time associated with the receive antenna 106 which is output as a phase signal. The phase extractor 128 may receive the phase signal output by phase detector 120 and be arranged to measure a phase of the electromagnetic wave when the electromagnetic wave arrives at the antenna 104. Similarly, the phase extractor 126 may receive the phase signal output by phase detector 124 and be arranged to measure a phase of the electromagnetic wave when the electromagnetic wave arrives at the antenna 106.

In examples, the phase detector 120 may determine a phase of the antenna signal as a function of time associated with the receive antenna 104 by correlating the received pulse sequence of the antenna signal with an expected pulse sequence to determine a channel impulse response (CIR). The phase detector 120 and phase detector 124 may include an analog/digital front end which comprises one or more signal processing components such as a low noise amplifier, mixer, local oscillator, filter, and analog-to-digital converter to demodulate the electromagnetic wave to baseband to recover the received pulse sequence. The expected pulse sequence may be an indication of the transmitted pulse sequence transmitted by the transmitter 108. The CIR is an estimate of a channel response of a channel defined by the air interface between the transmitter 108 and a respective antenna as a function of time. The CIR describes a change in the transmitted pulse sequences by the channel which is then received as the received pulse sequence. The correlation (e.g., a cross-correlation) is a measure of similarity between the received pulse sequence and the expected pulse sequence which in some examples is a function of displacement of one relative to the other. In examples, the CIR is initially represented by complex numbers where each complex number has a real and imaginary part in a cartesian coordinate system. The complex numbers of the CIR may be converted to magnitude and phase in a polar coordinate system and the phase of the CIR as a function of time may be the phase signal output by the phase detector 120. The phase extractor 128 may then determine a measured phase of the CIR associated at a time of arrival of a pulse of the received pulse sequence which is output by the phase extractor 128. The phase extractor 126 may perform processing similar to the phase extractor 126 based on the phase signal output by phase detector 124. The phase extractor 128 may output a measured phase of the CIR associated with a time of arrival of a pulse of a received pulse sequence. The received pulse sequence may be associated with the antenna signal from antenna 106 and the measured phase output by the phase extractor 126.

The PDoA measurer 112 may receive the indications of measured phase from each of the phase extractors 126, 128 and subtract the two measured phases. The phase difference of arrival (PDoA) can be computed as $$PDoA_{meas} = \arg a1(t) - \arg a2(t) \quad (4)$$

which is a measured PDoA because the PDoA is based on the measured phase of the antenna signal of each receive antenna 104, 106. The function arg in equation 4 indicates measurement of the phase of an antenna signal at a time the electromagnetic wave first arrives at an antenna.

The antenna signals of the two receive antennas 104, 106 received by the PDoA measurer 112 via the PCB traces 110 may be distorted. The distortion may be caused by undesired capacitive, inductive, and/or conductive coupling between the receive antennas 104, 106. Additionally, or alternatively, the distortion may be caused by undesired capacitive, inductive, and/or conductive coupling between the PCB traces 110. These distortion is known as crosstalk. Among other effects, the crosstalk distorts the phase of each of the antenna signals and resulting PDoA as computed by equation 4 above. The measured PDoA is corrected to account for this crosstalk to improve a resulting determination of AoA of the electromagnetic wave at a receive antenna.

The PDoA corrector 114 may be arranged to correct the measured PDoA for the crosstalk by determining a correction. The PDoA corrector 114 may receive the measured PDoA output by the PDoA measurer 112. The receiver 102 may also store in a memory (not shown) an indication of crosstalk factors. Crosstalk is the transmission of signals and noise due to coupling between lines, and is also called interference. The crosstalk factors may represent one or more of a gain K or crosstalk phase φ added to the antenna signals resulting from the crosstalk of the receive antennas 104, 106 and/or PCB traces 110. The crosstalk may be determined by an S21 (s-parameter) analysis of the crosstalk between receive antennas 104, 106 (S1=antenna 104 and S2=antenna 106, hence S21) and/or PCB traces 110 during a testing of the receive antennas 104, 106 or from a simulation which characterizes the crosstalk between the receive antennas 104, 106. The determined indication of the crosstalk may be stored in the memory of the receiver 102. The PDoA corrector 114 may determine the correction based on the measured PDoA and the crosstalk factors.

The correction determined by the PDoA corrector 114 may be provided to a combiner 116. Additionally, the combiner 116 may receive the measured PDoA from the PDoA measurer 112. In examples, the combiner 116 may be arranged to combine, and in some examples, sum the measured PDoA and correction to determine a corrected PDoA which compensates for the phase distortion of the antenna signal of the antenna 104 and the antenna signal of the antenna 106 due to crosstalk. The corrected PDoA is represented as follows:

$$PDOA_{corr} = PDOA_{meas} + \Psi(K, \phi, PDOA_{meas}) \quad (5)$$

where function $\Psi$ is the correction which depends on the crosstalk factors and the measured $PDOA_{meas}$, and yields a correction which compensates the distortion in $PDOA_{meas}$.

The corrected PDoA from the combiner 116 may be input to the AoA generator 118 which is arranged to determine the AoA of the electromagnetic wave at the receiver 102. The AoA may be based on the corrected PDoA from the combiner 116, the wavelength of the electromagnetic wave, and the distance L between the receive antennas 104, 106. In examples, indication of the wavelength and distance L may be stored in a memory of the receiver 102 and accessible to the AoA generator 118 to determine the AoA. The AoA may be represented as follows:

$$AoA = \alpha = \arcsin\left(\frac{PDoAcorr\lambda}{2\pi L}\right) \quad (6)$$

The receiver 102 may use the AoA to determine the position of the transmitter 108 among other purposes. The electromagnetic wave may have an AoA a at the receive antenna 104 as shown and this same electromagnetic wave may have an AoA a at the receive antenna 106 and the receiver 102 generally.

In some examples, the receiver 102 may be arranged as a complex receiver and each antenna signal may include in-phase and quadrature components. The analog/digital front end of the phase detector 120 may include a local oscillator (LO) connected to a mixer in an I (in-phase) branch, and the LO signal shifted by 90° is connected to a mixer in a Q (quadrature) branch. The quadrature antenna signal may be mixed with the LO signals and after one or more of low-pass filtering and analog-to-digital conversion the analog/digital front end may provide I and Q samples in a digital baseband domain. A phase may be determined based on a value of an I and Q sample at time or an average of multiple I samples and an average of multiple Q samples over a period of time. Further, phases of the I and Q samples over time associated with the receive antenna 104 may be output as a phase signal. The phase extractor 126 may then determine a measured phase associated at a time of arrival of the electromagnetic wave incident on antenna 104 which is output by the phase extractor 126. The time of arrival may be when a value of one or more of the I and Q samples exceeds a threshold amount from a noise floor, for example. The phase extractor 126 may perform processing similar to the phase extractor 128 based on the phase signal output by phase detector 124. The phase extractor 128 may determine a measured phase associated at a time of arrival of the electromagnetic wave incident on antenna 106 which is output by the phase extractor 126 in a manner similar to that of phase extractor 128. The PDoA measurer 112 may then determine the PDoA based on the measured phases from phase extractor 126 and phase extractor 128 as described above.

Example Operation

Figure 2:
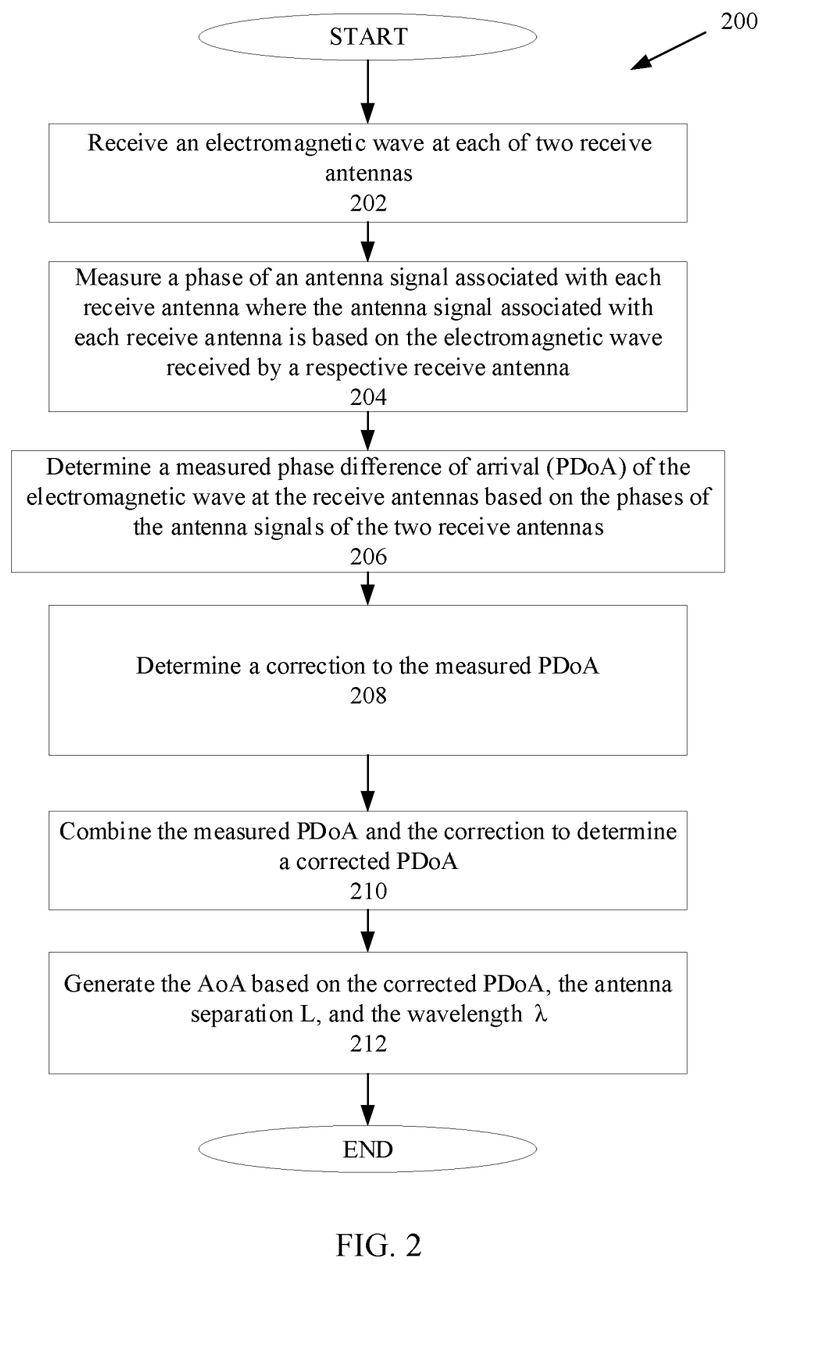
FIG. 2 is an example flowchart of functions associated with determining the AoA of the electromagnetic wave at the receive antenna.

FIG. 2 is an example flowchart 200 of functions 202-212 associated with determining the angle of arrival (AoA) of the electromagnetic wave at the receiver 102. In examples, a function of the functions 202-212 may be implemented using circuitry such as analog circuitry, mix signal circuitry, memory circuitry, logic circuitry, and/or processing circuitry arranged to execute code stored in a memory that when executed by the processing circuitry perform the disclosed function.

At block 202, an electromagnetic wave is received at each of the two receive antennas 104, 106. The electromagnetic wave may be a modulated sinusoid which defines a pulse sequence and in some examples synthesized from two amplitude modulated sinusoids that are offset in phase, referred to as an in-phase component and a quadrature component or amplitude modulated sinusoid carrier waves which are in phase. The electromagnetic wave which is received by each antenna 104, 106 are phase shifted from each other because the receive antennas 104, 106 are physically separated from each other by distance L.

At block 204, a phase of an antenna signal associated with each receive antenna is measured where the antenna signal associated with each receive antenna is based on the electromagnetic wave received by a respective receive antenna. The phase detector 120, 124 may output a respective phase signal and the phase extractor 126, 128 may measure the phase. In some examples, the phase extractor 126, 128 may measure the phase of a CIR when a first pulse of a pulse sequence is received. In other examples, the phase extractor 126, 128 may measure the phase associated with an antenna signal with in phase and quadrature components when the antenna signal arrives at a receive antenna.

At block 206, a measured phase difference of arrival (PDoA) of the electromagnetic wave is determined based on the phases of the antenna signals of the two receive antennas. The measured PDoA determined by the PDoA measurer 112 may be based on a difference between the phases of the antenna signals determined at block 204.

At block 208, a correction to the measured PDoA is determined. The correction corrects for distortion in the measured phase of the antenna signals at block 204 due to crosstalk between the two antennas 104, 106 and/or between the PCB traces 110 from the receive antenna 104, 106 to the receiver 102. The PDoA corrector 114 may calculate the correction based on crosstalk factors K, phase ϕ and the measured PDoA and represented as $\Psi(K, \phi, PDoA_{meas})$ The correction may be derived based on the antenna signals of equations 1 and 2, now written as:

$$a_1(t) = g^- e^{j\Delta\phi} e^{j\omega t} \quad (7)$$

$$a_2(t) = g^+ e^{j\omega t} \quad (8)$$

where the complex gains are $$g^\pm = 1 + K e^{j(\phi \pm \Delta\phi)} \quad (9)$$

with K and ϕ being the gain and phase of the crosstalk, respectively. The phase difference of arrival (PDoA) can be computed as:

$$PDoA = \arg a_1(t) - \arg a_2(t) \quad (10)$$

$$= \Delta\phi + \arg g^- - \arg g^+ \quad (11)$$

Note that if K=0 (no crosstalk), then arg $g^{+/-}$=0 and PDoA=Δϕ as desired.

In examples, the correction may be simplified by making approximations when K is small. The argument of the complex gains in (8) can be written as $$\arg g^{+/-} = \arctan \frac{K \sin(\phi \pm \Delta\phi)}{1 + K \cos(\phi \pm \Delta\phi)} \quad (12)$$

Applying an subtraction formula for arctangent:

$$\arctan(x) - \arctan(y) = \arctan((x-y)/(1+xy)) \quad (13)$$

it follows that $$PDoA = \Delta\phi - \Psi(\Delta\phi) \quad (14)$$

where the correction $\Psi(\Delta\phi)$ which is the PDoA error due to the crosstalk, is $$\Psi(\cdot) = \arctan \frac{2K \cos(\phi) \sin(\Delta\phi) + K^2 \sin(2\Delta\phi)}{1 + 2K \cos(\phi) \cos(\Delta\phi) + K^2 \cos(2\Delta\phi)} \quad (15)$$

For small K, using the approximation arctan(x)≈x yields the correction $$\Psi(\cdot) = \frac{2K \cos(\phi) \sin(\Delta\phi) + K^2 \sin(2\Delta\phi)}{1 + 2K \cos(\phi) \cos(\Delta\phi) + K^2 \cos(2\Delta\phi)} \quad (16)$$

Numerics show that the denominator is close to 1; thus $$\Psi(\cdot) = 2K \cos(\phi) \sin(\Delta\phi) + K^2 \sin(2\Delta\phi). \quad (17)$$

However, as the second term is generally smaller than the first term, it may be neglected to arrive at the final approximation of the correction:

$$\Psi(\cdot) = 2K \cos(\phi) \sin(\Delta\phi) \text{ or } \Psi(\cdot) = 2K \cos(\phi) \sin(PDoA_{meas}) \quad (18)$$

At block 210, the measured PDoA and the correction are combined by the combiner 116 to determine a corrected PDoA. The correction compensates for the distortion in $PDoA_{meas}$ due to the crosstalk. Mathematically, the corrected PDoA is computed as:

$$PDoA_{corr} = PDoA_{meas} + \Psi(K, \phi, PDoA_{meas}) \quad (19)$$

At block 212, the AoA is determined based on the corrected PDoA, $PDoA_{corr}$, the antenna separation L, and the wavelength λ. Mathematically, the AoA generator 118 determines the AoA in accordance with equation 6 above. The AoA may be used to determine the distance from the transmitter to the receiver in a positioning system, among other applications.

Figure 3A:
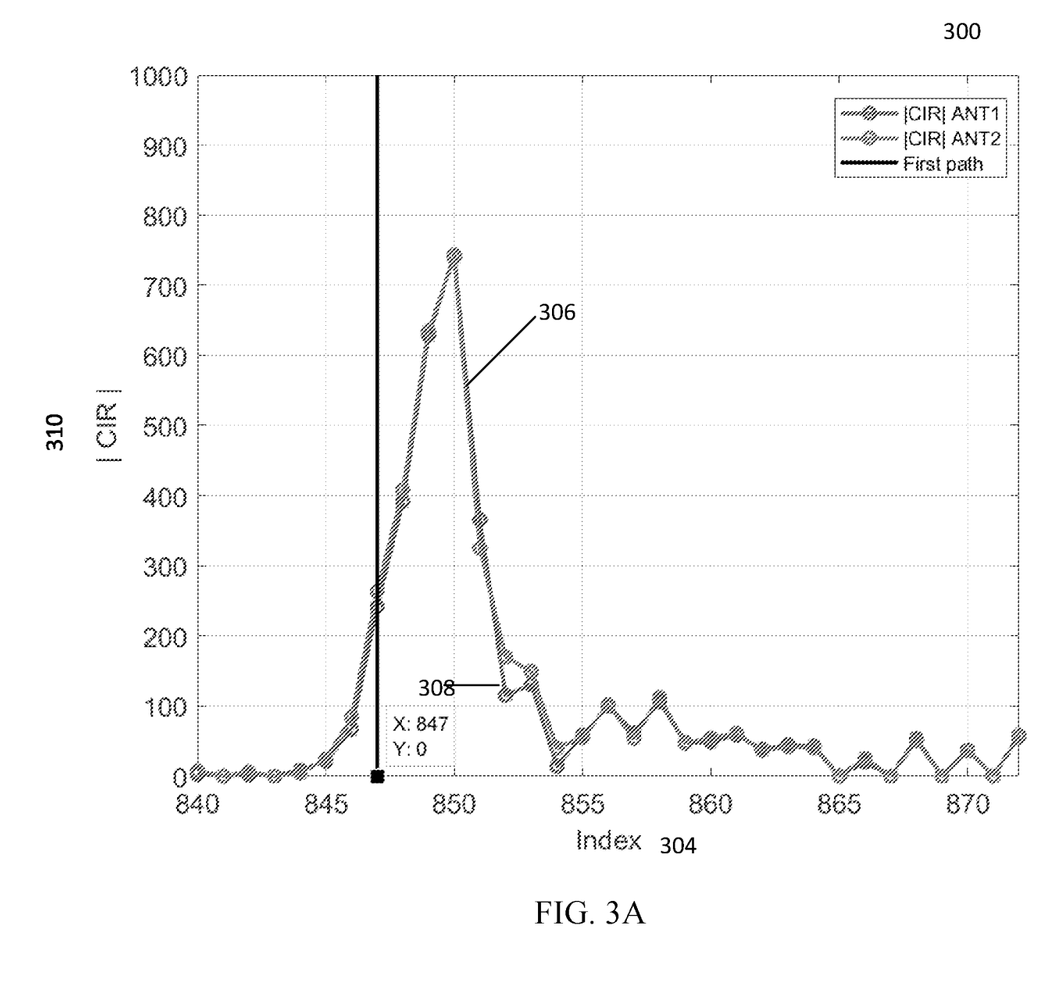
FIG. 3A and FIG. 3B are example plots of channel impulse responses (CIRs) determined based on an antenna signal of the receive antenna.
Figure 3B:
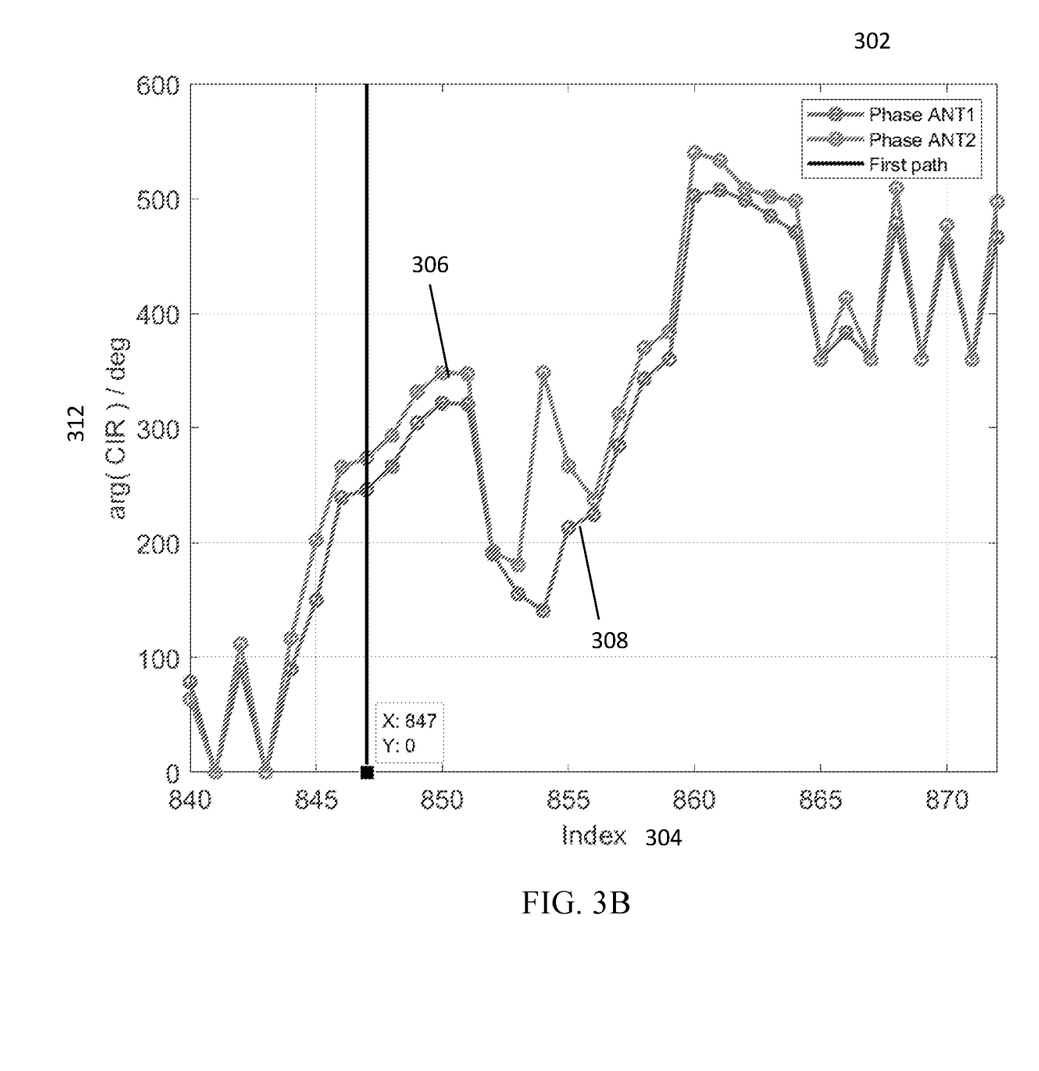

FIG. 3A and FIG. 3B are example respective plots of magnitude and phase of CIRs determined by the phase detector 120. The CIR may be an estimate of a channel response between the transmitter 108 and a receive antenna and used to determine the phase of the antenna signal in examples. The CIR may be determined by correlating a received pulse sequence of the antenna signal to an expected pulse sequence. The CIR may be initially defined by imaginary numbers each having a real and imaginary component. The real and imaginary component of each of the imaginary numbers may be converted to magnitude and phase.

FIG. 3A shows a magnitude of the CIR for each antenna signal (306, 308) on axis 310 of the plot 300 as a function of time or index along axis 304. The magnitude as a function of time may take the shape of a pulse indicative of receipt by the receive antennas of the one or more pulses transmitted by the transmitter 108. The index indicates an arrival timestamp of a pulse of the one or more pulses and index 847, for example, may indicate receipt of a first pulse of the pulse sequence and any earlier indices being associated with noise.

FIG. 3B shows a phase of the CIR for each antenna signal (306, 308) on axis 312 of the plot 302 as a function of time or index along axis 304. The time index 847 may indicate a phase of each antenna when the first pulse of the pulse sequence is received. A difference in phase of the CIRs at index 847 as shown in plot 302 indicates the measured PDoA at the time of arrival of the first pulse. The PDoA is approximately 25 degrees in this example. In examples, the phase of the CIR as a function of time may be the phase signal output by a phase detector.

Figure 4:
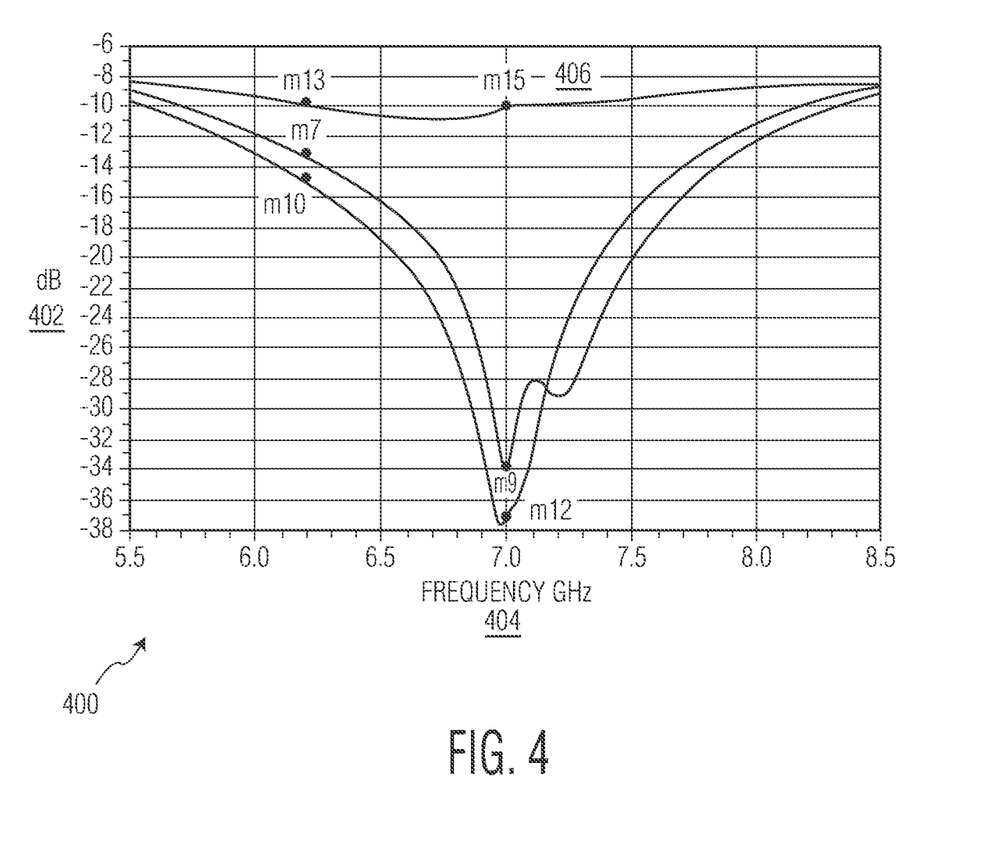
FIG. 4 shows an example S21 simulation of crosstalk.

FIG. 4 shows an example S21 simulation 400 to determine the crosstalk factors. The crosstalk may be between the two antennas 104, 106 and PCB traces 110. The crosstalk is shown in the S21 simulation 400 as example curves where gain K along axis 402 varies as a function of frequency along the axis 404. Specific points on curve 406 show a defined K gain for an antenna signal for a certain frequency. For example, point m15 shows that an antenna signal with frequency of 7 GHz has a gain of K=−10.1 dB. As another example, point m13 shows that an antenna signal with frequency of 6.2 GHz has a gain of K=−9.9 dB. As yet another example, point m14 shows that an antenna signal with frequency of 8.2 GHz has a gain of K=−8.5 dB. In general, as K increases for a fixed crosstalk phase, distortion of the phase of the antenna signals and resulting PDoA as computed by equation 4 above increases. In general, as crosstalk phase increases for a fixed K, distortion of the phase of the antenna signals and resulting error in the PDoA as computed by equation 4 above increases. The crosstalk factor K in addition to the phase may be stored in the memory of the receiver 102 and provided to the PDoA corrector 114 to determine a correction to the measured PDoA.

Figure 5A:
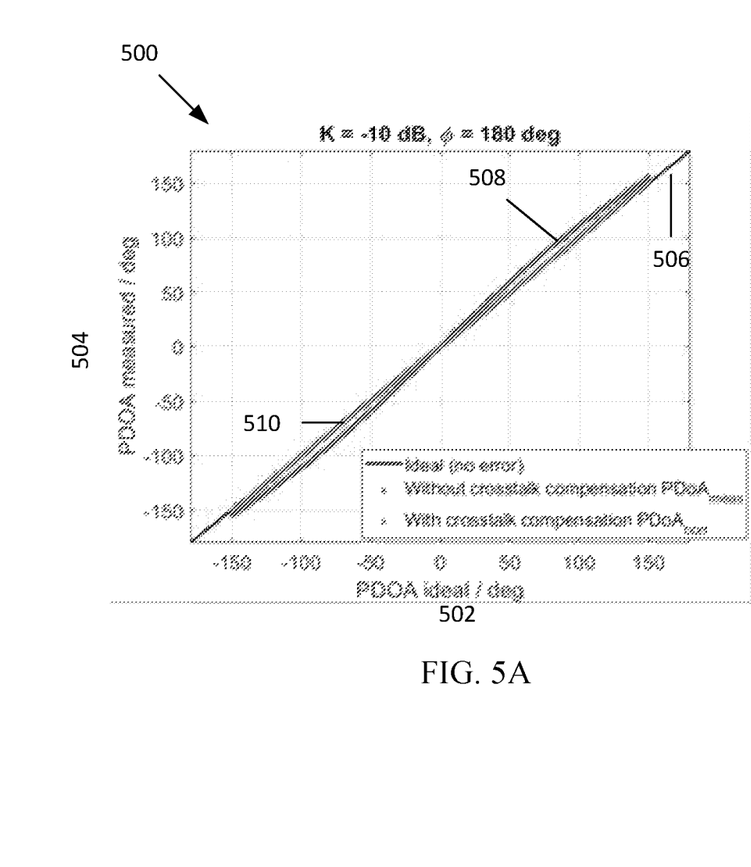
FIG. 5A and FIG. 5B show example simulations of how the PDoA correction affects the measured PDoA.
Figure 5B:
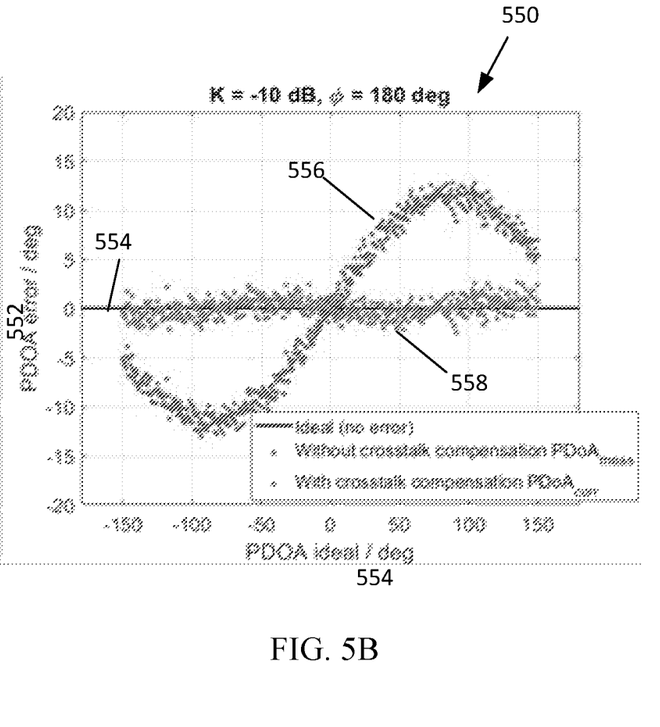

FIG. 5A and FIG. 5B show example simulations 500, 550 of how the PDoA correction impacts the measured PDoA. The PDoA correction reduces a difference between the measured PDoA after correction and the PDoA if there was no crosstalk.

The simulation 500 in FIG. 5A shows on axis 502 the ideal PDoA (degrees) if there is no crosstalk and on axis 504 the measured PDoA (degrees). If there is no crosstalk, then the ideal PDoA and the measured PDoA may be the same and which is represented as curve 506. The crosstalk is modeled with K=−10 dB and a worst case crosstalk phase of 180 degrees. Without correction of the measured PDoA, the measured PDoA and the ideal PDoA differ as shown by curve 508. Curve 510 shows correction of the measured PDoA based on the cross talk. Curve 510 is closer to the curve 506 confirming that the correction improves the determination of the PDoA.

The simulation 550 in FIG. 5B shows on axis 552 an error (degrees) in the measured PDoA and on axis 554 the ideal PDoA (degrees). The crosstalk is modeled with K=−10 dB and a worst case crosstalk phase of 180 degrees. Curve 554 shows the error in the measured PDoA from the ideal PDoA when no crosstalk is present. The error is close to zero. Curve 556 shows the error in the measured PDoA from the ideal PDoA when the measured PDoA is not corrected. The error is as much as +/−12 degrees. Curve 558 shows the error in the measured PDoA from the ideal PDoA when the measured PDoA is corrected. The correction of the measured PDoA reduces and in some examples eliminates the error in the measured PDoA from the actual PDoA, limited only by Gausian thermal noise.

Figure 6:
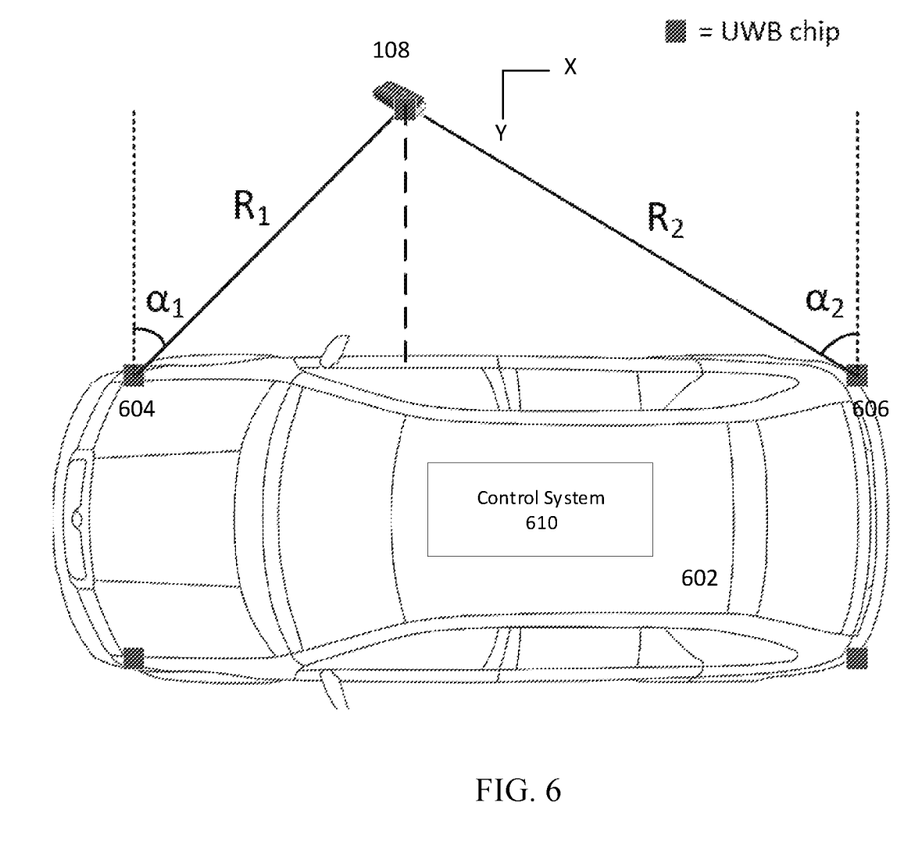
FIG. 6 illustrates an example of determining a position of a transmitter relative to a vehicle based on the AoA of the electromagnetic wave at the receive antenna.

FIG. 6 illustrates an example of determining a position of a transmitter 108 relative to a vehicle 602 based on an AoA of an electromagnetic wave at a receive antenna of one or more receivers 102 and a distance measurement. In this regard, components of the block diagram 100 may be subsystems of a larger system. The transmitter 108 may be, for example, a keyfob or a transmitter in a wireless phone such as a smartphone, and the vehicle 602 may have a respective receiver 102 located at an example position 604 on the vehicle 602 and an example position 606 on the vehicle 602. In this vehicle application, the receiver 102 may be an ultrawide band (UWB) receiver chip. The receiver 102 at the position 604 may determine an AoA of an electromagnetic wave at a receive antenna. The receiver 102 at the position 606 may determine an AoA of an electromagnetic wave at a receive antenna. As shown, position 604 may have an AoA of $\alpha_1$ and position 606 may have an AoA of $\alpha_2$. The receivers 102 may provide the AoAs to a control system 610 of the vehicle 604.

The transmitter 108 or the receiver 102 at position 604 may also compute a range R1 from the transmitter 108 to the position 604 and the transmitter 108 or the receiver 102 at position 606 may compute a range R2 from the transmitter 108 to the position 606. In this regard, R1 may be a measure of distance from the transmitter 108 to example position 604, and R2 may be measure of distance from the transmitter 108 to example position 606. In examples, the ranging may be based on two-way ranging (TWR). To facilitate this ranging, the position 602 and position 604 may additionally have a transmitter to transmit one or more signals which are received by a receiver co-located with the transmitter 108. The range R1 may be determined based on measurement of a time that one or more signals takes to travel from the transmitter 108 to the receiver 102 at the position 604 or from the transmitter at position 604 to the receiver co-located with the transmitter 108 and speed of the signal represented by the speed of light. Similarly, range R2 may be determined based on measurement of a time that one or more signals takes to travel from the transmitter 108 to the receiver 102 at the position 606 or from the transmitter at position 606 to the receiver co-located with the transmitter 108 and speed of the signal represented by the speed of light. Based on the ranges R1 and R2 and $\alpha_1$ and $\alpha_2$, the control system 610 may determine a position of the transmitter 108 relative to the vehicle 602, for example, using trigonometric functions. In examples, the position of the transmitter 602 may be specified relative to a reference point on the vehicle 602 in a coordinate system such as the shown "xy" coordinate system.

In some examples, one or more circuitry associated with the phase detector 120, 124, the phase extractor 126, 128, the PDoA measurer 112, the PDoA corrector 114, the combiner 116, or the AoA generator 118 may be separated by a network such as a local interconnect network (LIN) or controller area network (CAN). For instance, the output of the phase detectors 120, 124 and the antenna signals may be transmitted over a network to the control system 610 which has circuitry associated with the PDoA measurer 112, the PDoA corrector 114, the combiner 116, or the AoA generator 118 to generate an AoA. Other implementations are also possible.

In some examples, the receiver 102 may be coupled to N antennas where N is greater than two. The receiver may have a phase detector and phase extractor to measure a phase of each antenna signal associated with an arrival of an electromagnetic wave and the PDoA measurer 112 and the PDoA corrector 114 may each have N inputs corresponding to the measured phase associated with each antenna. The PDoA corrector 114 may receive a plurality of crosstalk factors K corresponding to various combinations of two antennas of the N antennas such as for N=3: K_2,1=K_1, 2=G_1, K_3,1=K_1,3=G_2, K_3,2=K_2,3=G_3 where G_i is a gain K for an antenna combination I such as G_1 for a combination of antenna 1 and antenna 2, G_2 for a combination of antenna 1 and antenna 3 etc., and K_m,n corresponds to the crosstalk between antennas m and n. The PDoA corrector 114 may similarly receive a plurality of crosstalk factors for phase ϕ corresponding to various combinations of two antennas of the N antennas. The PDoA corrector 114 may determine a correction to the measured PDoA determined by the PDoA measurer 112 which is combined by combiner 116 to determine an angle of arrival AoA.

Figure 7:
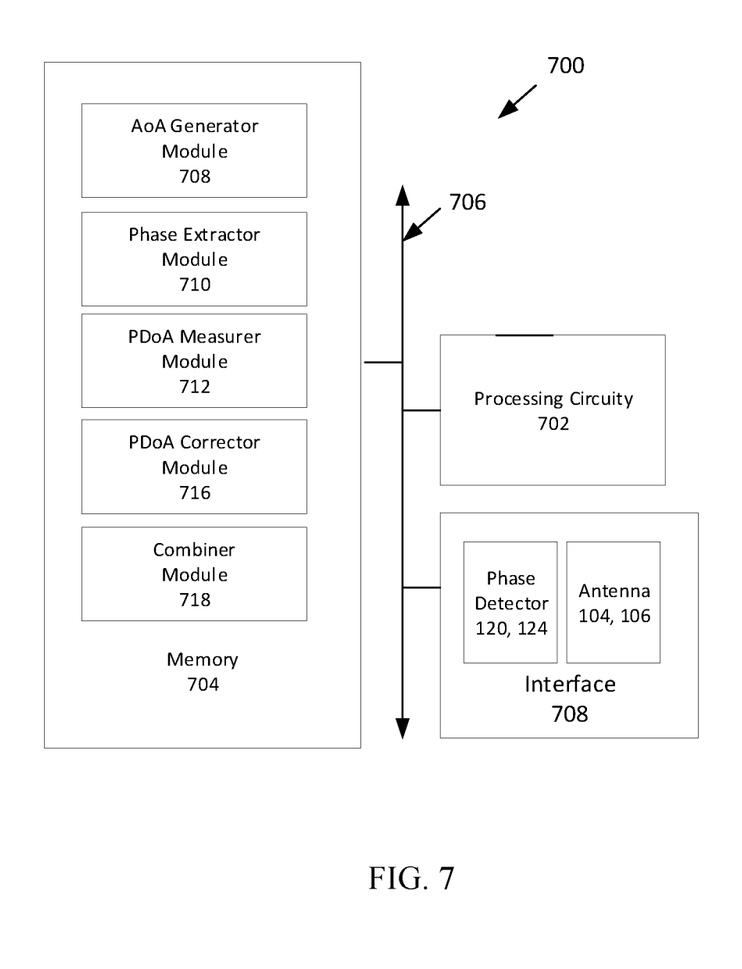
FIG. 7 is a block diagram of an example apparatus for determining the AoA of the electromagnetic wave at the receive antenna.

FIG. 7 is an example block diagram of apparatus 700 which performs functions associated with determining the AoA of an electromagnetic wave at a receive antenna. The apparatus 700 may have processing circuitry 702 (possibly including multiple processors, multiple cores, multiple nodes, and/or implementing multi-threading, etc.) and memory 704 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium. The memory 704 may store computer code, program instructions, computer instructions, program code for performing one or more operations or control of operations associated with the phase extractor 126, 128, the PDoA measurer 112, the PDoA corrector 114, the combiner 116, or the AoA generator 118, as described above, shown as software modules 708-718. The apparatus 700 also includes a bus 706 (e.g., PCI, ISA, PCI-Express) which couples the processing circuitry 702, memory 704, and interface 708. The interface 708 may include the two antennas 104, 106 and the phase detector 120, 124 which receives antenna signals from the two antennas 104, 106 and has circuitry to generate a phase signal which is provided over the bus to the processing circuitry 702 and/or memory 704 in some examples.

In one embodiment, a method to determine an angle of arrival (AoA) of an electromagnetic wave at two receive antenna is disclosed. The method comprises: receiving, by the two receive antenna, the electromagnetic wave; measuring a phase of an antenna signal associated with each receive antenna, the antenna signal being generated based on receipt of the electromagnetic wave at a respective receive antenna and the measured phase being the phase of the antenna signal when the electromagnetic wave arrives at the respective receive antenna; determining a measured phase difference of arrival (PDoA) associated with the electromagnetic wave based on the measured phase of each of the antenna signals; correcting the measured PDoA based on one or more crosstalk factors associated with the two receive antennas; and generating the AoA of the electromagnetic wave at the two receive antenna based on the corrected measured PDoA. In an embodiment, measuring the phase of the antenna signal associated with each receive antenna comprises measuring the phase when a pulse of the electromagnetic wave arrives at the respective receive antenna. In an embodiment, the crosstalk factors are based on at least one of an electromagnetic coupling of the two receive antennas or connections which couple the two receive antennas to a receiver. In an embodiment, the two receive antennas are separated by a distance L greater than zero. In an embodiment, correcting the measured PDoA comprises computing the correction $\Psi(\cdot)=2K \cos(\phi) \sin(PDoA_{meas})$ where K and $\phi$ are the crosstalk factors and $PDoA_{meas}$ is the measured PDoA. In an embodiment, outputting, by the receiver, the AoA comprises computing arcsin $$\left(\frac{PDoAcorr \, \lambda}{2\pi L}\right)$$

where L is a distance between the two antennas, $\lambda$ is a wavelength of the electromagnetic wave, and $PDoA_{corr}$ is the corrected measured PDoA. In an embodiment, the electromagnetic wave is transmitted by a transmitter, the method further comprising determining a position of the transmitter based on the AoA.

In another embodiment, a system is disclosed. The system comprises: two receive antennas arranged to receive an electromagnetic wave; a phase detector implemented with circuitry to measure a phase of an antenna signal associated with each receive antenna, the antenna signal being generated based on receipt of the electromagnetic wave at a respective receive antenna and the measured phase being the phase of the antenna signal when the electromagnetic wave arrives at the respective receive antenna; a PDoA measurer implemented with circuitry to determine a measured PDoA associated with the electromagnetic wave based on the measured phase of each of the antenna signals; a PDoA corrector implemented with circuitry to determine a correction to the measured PDoA based on one or more crosstalk factors associated with the two receive antennas; a combiner implemented with circuitry arranged to combine the measured PDoA and the correction; and an AoA generator implemented with circuitry to generate the AoA of the electromagnetic wave at the two receive antenna based on the corrected measured PDoA. In an embodiment, the one or more crosstalk factors comprises at least one of a gain K or phase $\phi$ associated with the two receive antennas. In an embodiment, the crosstalk factors are based on at least one of an electromagnetic coupling of the two receive antennas and connections which couple the two receive antennas to a receiver. In an embodiment, the two receive antennas are separated by a distance L greater than zero and the electromagnetic wave arrives at the respective receive antenna when a pulse of the electromagnetic wave arrives at the respective receive antenna. In an embodiment, the PDoA corrector arranged to determine the correction comprises the PDoA corrector arranged to compute the correction $\Psi(\cdot)=2K \cos(\phi) \sin(PDoA_{meas})$ where K and $\phi$ are the crosstalk factors and $PDoA_{meas}$ is the measured PDoA. In an embodiment, the AoA generator arranged to output the AoA comprises the AoA arranged to compute arcsin $$\left(\frac{PDoAcorr \, \lambda}{2\pi L}\right)$$

where L is a distance between the two antennas, $\lambda$ is a wavelength of the electromagnetic wave, and $PDoA_{corr}$ is the corrected measured PDoA. In an embodiment, the electromagnetic wave is transmitted by a transmitter, the system further comprising circuitry to determine a position of the transmitter based on the AoA.

In yet another embodiment, one or more non-transitory machine-readable media comprising program code executable by processing circuitry is disclosed to measure a phase of an antenna signal associated with each of two receive antenna, the antenna signal being generated based on receipt of an electromagnetic wave at a respective receive antenna and the measured phase being the phase of the antenna signal when the electromagnetic wave arrives at the respective receive antenna; determine a measured phase difference of arrival (PDoA) associated with the electromagnetic wave based on the measured phase of each of the antenna signals; correct the measured PDoA based on one or more crosstalk factors associated with the two receive antennas; and generate the AoA of the electromagnetic wave at the two receive antenna based on the corrected measured PDoA. In an embodiment, the program code to measure the phase of the antenna signal associated with each receive antenna comprises program code to measure the phase when a pulse of the electromagnetic wave arrives at the respective receive antenna. In an embodiment, the crosstalk factors are based on at least one of an electromagnetic coupling of the two receive antennas and connections which couple the two receive antennas to a receiver. In an embodiment, the program code to correct the measured PDoA comprises program code to compute the correction $\Psi(\cdot)=2K \cos(\phi) \sin(PDoA_{meas})$ where K and $\phi$ are the crosstalk factors and $PDoA_{meas}$ is the measured PDoA. In an embodiment, the program code to output the AoA of the electromagnetic wave comprises program code to compute arcsin $$\left(\frac{PDoAcorr \, \lambda}{2\pi L}\right)$$

where L is a distance between the two antennas, $\lambda$ is a wavelength of the electromagnetic wave, and $PDoA_{corr}$ is the corrected measured PDoA. In an embodiment, the electromagnetic wave is transmitted by a transmitter, the one or more non-transitory machine-readable media further comprising program code to determine a position of the transmitter based on the AoA.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method to determine an angle of arrival (AoA) of an electromagnetic wave, the method comprising:
receiving, by two receive antenna, the electromagnetic wave;
measuring a phase of an antenna signal associated with each receive antenna, the antenna signal being generated based on receipt of the electromagnetic wave at a respective receive antenna and the measured phase being the phase of the antenna signal when the electromagnetic wave arrives at the respective receive antenna;
determining a measured phase difference of arrival (PDoA) of the electromagnetic wave based on the measured phase of each of the antenna signals;
correcting the measured PDoA based on one or more crosstalk factors associated with the two receive antennas; and
generating the AoA of the electromagnetic wave at the two receive antenna based on the corrected measured PDoA;
wherein the crosstalk factors are based on at least one of an electromagnetic coupling of the two receive antennas or connections which couple the two receive antennas to a receiver.

2. The method of claim 1, wherein measuring the phase of the antenna signal associated with each receive antenna comprises measuring the phase when a pulse of the electromagnetic wave arrives at the respective receive antenna.

3. The method of claim 1, wherein the two receive antennas are separated by a distance L greater than zero.

4. The method of claim 1, wherein correcting the measured PDoA comprises computing the correction $\Psi(\cdot)=2K \cos(\phi) \sin(PDoA_{meas})$ where K and $\phi$ are the crosstalk factors and $PDoA_{meas}$ is the measured PDoA.

5. The method of claim 1, wherein outputting, by the receiver, the AoA comprises computing arcsin $$\left(\frac{PDoAcorr\lambda}{2\pi L}\right)$$

where L is a distance between the two antennas, $\lambda$ is a wavelength of the electromagnetic wave, and $PDoA_{corr}$ is the corrected measured PDoA.

6. The method of claim 1, wherein the electromagnetic wave is transmitted by a transmitter, the method further comprising determining a position of the transmitter based on the AoA.

7. A system comprising:
two receive antennas arranged to receive an electromagnetic wave;
a phase detector implemented with circuitry to measure a phase of an antenna signal associated with each receive antenna, the antenna signal being generated based on receipt of the electromagnetic wave at a respective receive antenna and the measured phase being the phase of the antenna signal when the electromagnetic wave arrives at the respective receive antenna;
a PDoA measurer implemented with circuitry to determine a measured PDoA of the electromagnetic wave based on the measured phase of each of the antenna signals;
a PDoA corrector implemented with circuitry to determine a correction to the measured PDoA based on one or more crosstalk factors associated with the two receive antennas;
a combiner implemented with circuitry arranged to combine the measured PDoA and the correction; and
an AoA generator implemented with circuitry to generate the AoA of the electromagnetic wave at the two receive antenna based on the corrected measured PDoA wherein the crosstalk factors are based on at least one of an electromagnetic coupling of the two receive antennas and connections which couple the two receive antennas to a receiver.

8. The system of claim 7, wherein the one or more crosstalk factors comprises at least one of a gain K or phase φ associated with the two receive antennas.

9. The system of claim 7, wherein the two receive antennas are separated by a distance L greater than zero and the electromagnetic wave arrives at the respective receive antenna when a pulse of the electromagnetic wave arrives at the respective receive antenna.

10. The system of claim 7, wherein the PDoA corrector arranged to determine the correction comprises the PDoA corrector arranged to compute the correction $\Psi(\cdot)=2K\cos(\phi)\sin(PDoA_{meas})$ where K and φ are the crosstalk factors and $PDoA_{corr}$ is the measured PDoA.

11. The system of claim 7, wherein the AoA system arranged to output the AoA comprises the AoA arranged to compute arcsin $$\left(\frac{PDoAcorr\lambda}{2\pi L}\right)$$

where L is a distance between the two antennas, λ is a wavelength of the electromagnetic wave, and $PDoA_{corr}$ is the corrected measured PDoA.

12. The system of claim 7, wherein the electromagnetic wave is transmitted by a transmitter, the system further comprising circuitry to determine a position of the transmitter based on the AoA.

13. One or more non-transitory machine-readable media comprising program code executable by processing circuitry to:
  measure a phase of an antenna signal associated with each of two receive antenna, the antenna signal being generated based on receipt of an electromagnetic wave at a respective receive antenna and the measured phase being the phase of the antenna signal when the electromagnetic wave arrives at the respective receive antenna;
  determine a measured phase difference of arrival (PDoA) of the electromagnetic wave based on the measured phase of each of the antenna signals;
  correct the measured PDoA based on one or more crosstalk factors associated with the two receive antennas; and
  generate the AoA of the electromagnetic wave at the two receive antenna based on the corrected measured PDoA
  wherein the crosstalk factors are based on at least one of an electromagnetic coupling of the two receive antennas and connections which couple the two receive antennas to a receiver.

14. The one or more non-transitory machine-readable media of claim 13, wherein the program code to measure the phase of the antenna signal associated with each receive antenna comprises program code to measure the phase when a pulse of the electromagnetic wave arrives at the respective receive antenna.

15. The one or more non-transitory machine-readable media of claim 13, wherein the program code to correct the measured PDoA comprises program code to compute the correction $\Psi(\cdot)=2K\cos(\phi)\sin(PDoA_{meas})$ where K and φ are the crosstalk factors and $PDoA_{meas}$ is the measured PDoA.

16. The one or more non-transitory machine-readable media of claim 13, wherein the program code to output the AoA of the electromagnetic wave comprises program code to compute arcsin $$\left(\frac{PDoAcorr\lambda}{2\pi L}\right)$$

where L is a distance between the two antennas, λ is a wavelength of the electromagnetic wave, and $PDoA_{corr}$ is the corrected measured PDoA.

17. The one or more non-transitory machine-readable media of claim 13, wherein the electromagnetic wave is transmitted by a transmitter, the one or more non-transitory machine-readable media further comprising program code to determine a position of the transmitter based on the AoA.

\* \* \* \* \*